July 27, 1948.  S. P. LOVELL  2,445,791
LAST
Filed July 21, 1945
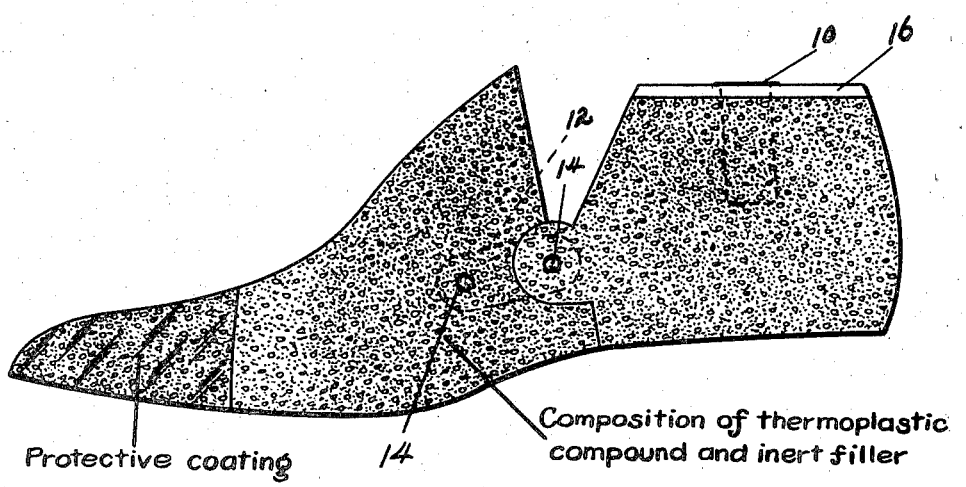
Protective coating  
Composition of thermoplastic compound and inert filler
Inventor:
Stanley P. Lovell.
Attorneys Patented July 27, 1948

2,445,791

UNITED STATES PATENT OFFICE 2,445,791

LAST

Stanley P. Lovell, Newtonville, Mass.

Application July 21, 1945, Serial No. 606,304

2 Claims. (Cl. 12—136)

My invention concerns lasts for the making of shoes, shoetrees, patterns, and forms and form material. The employment of wood for these purposes has long posed difficulties but its general use indicates that heretofore no better material has been available. In the case of wooden lasts for shoes, for example, rock maple is customarily utilized. It has the following drawbacks:

(a) Rock maple is in scarce supply.

(b) It is difficult and expensive to season as it develops seams and cracks.

(c) Relatively large blocks have to be initially turned, followed by the final turning to precise shape. All wood removed in turning is completely lost.

(d) The relatively expensive metal parts, such as the hinge, the jack-hole liner, and the heel plate, are wasted economically when the last is discarded.

(e) Most important, the finished product is subject to constant changes in moisture content. These may be as much as twelve percent by weight. The accuracy of supposedly mated shoes and the reproducibility of marked sizes (length and width) are both seriously affected thereby. Thus the warping and constantly changing last dimensions cause misfit footwear and mismating. This in turn leads to foot injury and discomfort.

I have discovered a novel material and a method which overcome the disadvantages above listed and which, at the same time, possess important advantages. Specifically, I employ a thermoplastic long-chain-molecule compound having the property of repeated heat conformation at temperatures higher than boiling water, of water absorption of less than five percent and with a modulus of elasticity (p. s. i. $\times 10^4$) of not less than 0.8.

In a standard mixer under heat I incorporate into such a thermoplastic material an inert filler having the property, in the combined and cooled mass, of retaining tacks and nails repeatedly driven into approximately the same hole. This characteristic is essential in the bottom composition of a shoe last, for example. My preferred inert fillers are (1) ground cork, (2) wood flour, (3) cotton floc, or admixtures of them.

For my thermoplastic compound I prefer (1) ethyl cellulose either in the pure form or as commonly available under the trade name "Ethocel," (2) a composition of polystyrene, rubber and rosin, one usable mixture approximating polystyrene 48%, rubber 12%, rosin 40%, or (3) cellulose aceto-butyrate containing sufficient plasticizer to achieve a softening point A. S. T. M. (Standard Bar Method) of approximately 170° F.

The percentage of inert filler in the blended mixture will vary with the specific product to be made therefrom but can be readily determined by any person skilled in the particular art. For example, in the manufacture of shoe lasts I employ 6 to 30 parts of inert filler, whereas in the production of shoe forms, shoetrees and the like I use 50 to 60 parts of inert filler.

When the thermoplastic compound is reduced by heat to a plasticity such that it will take into itself the inert filler, I introduce such filler a little at a time with continued mastication or kneading until all is incorporated into a pliant moldable mass.

In such condition I put it into my mold using moderate pressure to flow it into all contours thereof. Alternatively, the mold may be itself heated to say 350° F. and a rough block or matrix made of the above composition is forced into it under low pressure. My composition in contact with the hot mold surface softens and allows the mass to assume the detail of the mold.

All "flash," surplus, excess and trim may be reused and added to subsequent production. Most important, a shoe last or other form that has become outmoded or outworn may be cheaply and readily recast as often as desired into a new object by simple preheating and re-forming it, and all without substantial change in the properties of the material.

All metal parts can be inserted into the mass while it is soft and plastic by heat, or alternatively, by pre-heating the metal parts and allowing them to hot-seat and position themselves in precise location. Metal elements and parts from discarded, second-hand items can be readily removed by heating and reused.

In shoemaking, the toe area of each last is subject to repeated applications of organic solvents which are employed whenever a cellulosic box toe is made to conform to the last and allowed to harden in its shape. To prevent absorption and distortion by contact with such organic solvents, I coat all or merely the toe portion of my last with an insoluble film. This I do by dipping or spraying with suitable varnish. Such a varnish consists of a dispersion or solution of vinylidene dichloride, polythene, tetroflourethylene, rubber (raw or vulcanized), polyvinyl-alcohol and the like.

The particular film will be readily selected by skilled personnel in view of the particular solvents to which the last will be normally exposed during use. Thus no protection is required for shoe trees since their function is merely that of retaining or restoring the shape and contours of worn shoes. The same applies to shoe trees or feet used in shoe factories as supports during the cleaning and finishing of the shoe itself.

Since, however, shoe lasts are repeatedly exposed to water, steam and organic solvents around the toe area, such protection is mandatory in the case of lasts, if it is not implicit in the plastic itself. Thus, if ethyl cellulose is employed as a plastic, such solvents as ethylacetate, acetone, ethyl and methyl alcohol and, in short, most or all solvents of nitrocellulose will attack it.

In addition to the film-forming varnishes above disclosed I have found that a thermosetting resin film such as a phenol-formaldehyde varnish either air-dried or baked will protect such lasts. Any reasonably continuous film of a compound insoluble in shoe solvents and not disturbed by moderate steam treatment will answer the requirement.

The accompanying drawing is a view in side elevation of a hinged last embodying my invention. The last thimble 10 and link 12, which are both of conventional construction, are shown in dotted lines. The link 12 and the link pins 14 connect the two parts of the last and the cone of the last has a leather wear plate 16. The material of the last is a composition of approximately 48% polystyrene, 12% rubber and 40% rosin with additional filler, or 80% ethyl cellulose and 20% ground cork. The material of the protective coating of the toe portion of the last is an air-dried phenol-formaldehyde varnish.

By my invention I produce a form that is economical to make, that is reworkable and reformable at will, that is free from warpage, shrinkage and swelling, that firmly holds nails, screws and tacks upon their repeated insertion into the same approximate area and that has a longer useful life than forms made from materials previously employed, such as maple wood.

It is customary in shoe factories to throw lasts after removal from the shoe into bins whereby all lasts of the same size and width are sorted. Since this involves great shock, many lasts are dented and split. Since they are universally employed as pairs, such damage to one destroys the value of a pair of lasts or, alternatively, the shoe is faultily constructed over the dented or damaged area.

My new composition is sufficiently tough, and has sufficient strength and impact resiliency to withstand such violent treatment.

Another important advantage of the form material of my invention is that it is highly suitable for turning in a lathe. Accordingly I may supply the material in the form of rough blocks and from these blocks sets of lasts may be turned in a last lathe, following substantially the procedure heretofore practiced when maple blocks have been employed.

Having thus disclosed my invention what I claim as new and desire to secure by Letters Patent is:

1. A pattern having a body portion compounded of polystyrene as its principal ingredient, with smaller amounts or rubber and rosin, mixed together with 6 to 30 parts of filler selected from the group comprising ground cork, wood flour and cotton floc, and having portions coated with a film insoluble in organic solvents used in shoemaking, the said thermoplastic material of the pattern being capable of repeated remolding without substantial change in character.

2. A last having a body compounded approximately of polystyrene 48%, rubber 12%, and rosin 40% mixed with 6 to 30 parts of filler selected from the group comprising ground cork, wood flour and cotton floc, the last forepart being protected by a film of material resistant to organic solvents.

STANLEY P. LOVELL.

REFERENCES CITED

The following references are of record in the file of this patent:

UNITED STATES PATENTS

| Number | Name | Date |
|---|---|---|
| 639,349 | Brownson | Dec. 19, 1899 |
| 1,550,232 | Aiken | Aug. 18, 1925 |
| 1,592,722 | Carter | July 13, 1926 |
| 1,634,815 | Allen | July 5, 1927 |
| 2,094,868 | Baxter | Oct. 5, 1937 |
| 2,330,260 | Baxter | Sept. 28, 1943 |